United States Patent [19]

Stolarczyk

[11] Patent Number: 4,994,747
[45] Date of Patent: Feb. 19, 1991

[54] METHOD AND APPARATUS FOR DETECTING UNDERGROUND ELECTRICALLY CONDUCTIVE OBJECTS

[75] Inventor: Larry G. Stolarczyk, Raton, N. Mex.

[73] Assignee: Stolar, Inc., Raton, N. Mex.

[21] Appl. No.: 230,711

[22] Filed: Aug. 8, 1988

Related U.S. Application Data

[63] Continuation-in-part of Ser. No. 143,727, Jan. 14, 1988, abandoned.

[51] Int. Cl.$^5$ .......................... G01V 3/11; G01V 3/12; G01V 3/30
[52] U.S. Cl. .................................... 324/334; 324/337; 324/338
[58] Field of Search ................. 324/334–344, 324/326–329, 323; 166/248, 250; 340/853, 854, 870.28, 870.29

[56] References Cited

U.S. PATENT DOCUMENTS

| | | | |
|---|---|---|---|
| Re. 32,563 | 12/1987 | Stolarczyk | 324/334 |
| 3,065,408 | 11/1962 | Marsh | 324/334 |
| 3,609,522 | 9/1971 | Hutchins et al. | 324/334 |
| 3,690,164 | 9/1972 | Gabillard et al. | 324/338 X |
| 3,984,758 | 10/1976 | Millon | 324/338 |
| 4,161,687 | 7/1979 | Lytle et al. | 324/338 |
| 4,290,020 | 9/1981 | Hansen et al. | 324/334 |
| 4,393,350 | 7/1983 | Hanson et al. | 324/334 |
| 4,507,611 | 3/1985 | Helms | 324/344 X |
| 4,542,344 | 9/1985 | Darilek et al. | 324/326 |
| 4,577,153 | 3/1986 | Stolarczyk | 324/334 |
| 4,691,166 | 9/1987 | Stolarczyk | 324/338 X |

FOREIGN PATENT DOCUMENTS

896722 3/1972 Canada ................. 324/334

Primary Examiner—Reinhard J. Eisenzopf
Assistant Examiner—Warren S. Edmonds
Attorney, Agent, or Firm—Thomas E. Schatzel

[57] ABSTRACT

An apparatus and method for detecting vertically or horizontally oriented underground electrical conductors such as electrical wiring or rails in tunnels thin conducting ore veins surrounded by less conducting rock, or boreholes filled with conductive water or lined with a conductive casing. The apparatus includes a surface or downhole transmitter and a downhole receiver connected to a coherent frequency source unit by fiber optic cables. The source unit generates two phase synchronized frequency signals in the range of one hundred to three hundred kHz. The receiver includes a vertical or horizontal magnetic dipole antenna, e.g. a ferrite rod antenna, and the transmitter includes a vertical or horizontal magnetic dipole antenna in the downhole configuration or at least one long cable or loop antenna in the surface configuration. The method includes generating a first electromagnetic field which induces current flow in the electrical conductor surround by the less conducting rock and then detecting a component of a second electromagnetic field generated by the induced current flowing in the conductor, as a received signal at the receiver. The received signal is processed by synchronous detection in the coherent frequency source unit so that phase shift and amplitude data can be extracted from the received signal. The method can also be used to determine if the distance separating two drillholes is constant. In this case, the preferred operating frequency is above 10 MHz.

17 Claims, 4 Drawing Sheets

Fig_1
Fig_2
Fig_3

Fig_6

Fig_8

Fig_9

Fig_10

Fig_11

Fig_12

METHOD AND APPARATUS FOR DETECTING UNDERGROUND ELECTRICALLY CONDUCTIVE OBJECTS

This is a continuation-in-part of co-pending application Ser. No. 07/143,727 filed on Jan. 14, 1988.

BACKGROUND OF THE INVENTION

1. Field of the Invention

The present invention relates generally to a method and apparatus for detecting underground electrical conductors surrounded by less electrically conducting rock and more particularly to a method for detecting ore veins or electrically conducting equipment located in underground tunnels or boreholes. A phase coherent receiver is used to detect a magnetic field component of an electromagnetic field radiating through the less conductive rock surrounding the conductors that arises when synchronous current flow is induced in the electrical conductors by the electric field component of an EM wave produced by an antenna excited by a phase synchronized continuous wave transmitter.

2. Description of the Prior Art

Several techniques are currently used in military operations to detect underground tunnels. These include visual observation of surface features, surface drilling, use of acoustical and seismic systems and the deployment of various surface and downhole electromagnetic (EM) wave propagation methods.

Of these techniques, the EM techniques are the most promising because they are less sensitive to munition firings and random geologic structure noise. Two EM techniques presently in use are a cross-hole high frequency diffraction detection method claimed in U.S. Pat. No. 4,161,687, issued to Lytle, et al and a cross-hole pulsed EM system (PEMS) developed by the Southwest Research Institute and currently used by the U.S. Army.

Both of these cross-hole techniques are designed to detect changes in the electrical parameters of the geologic medium caused by the tunnel intersection with a vertical plane between two drillholes. However, both of these techniques utilize downhole transmitters and receivers that are connected to surface equipment by electrically conductive cable. This use of electrically conductive cable interferes with phase shift measurements and prevents the use of synchronous detection techniques.

In general, use of antennas and electromagnetic wave propagation methods in slightly conducting natural rock for remote sensing and mapping of subsurface geologic features, for applications in hardened military communications, and radio communications with miners working or trapped in underground tunnels has been reported in the literature. The subject area has been investigated for communications with submerged submarines. Review papers, Hansen, R.C., "Radiation and Reception With Buried and Submerged Antennas," IEEE Trans. on Ant. and Prop.; May 1963; and Moore, R.K., "Effects of a Surrounding Conducting Medium on Antenna Analysis", IEEE Trans. on Ant. and Prop.; May 1963, trace the historical development of the canonical theory from its late 18th century beginning with Heaviside, 0., "Electrical Papers", Vols. I and II, MacMillan and Company, Ltd., London, England 1882. The theoretical problem considered the interaction of antennas and EM field components with slightly conducting geologic medium. For radio communications, the problem considers radio wave propagation along the surface of the earth, direct paths through the earth, up over and down paths between submarines, and the possibility of a deeply buried natural waveguide in the earth. For geological investigations, the problem considers the detection of halos of chemically mineralized ore zones asosciated with faults and dikes, sandstone layers and voids in limestone that trap oil and gas, seams of coal, trona, potash, and anomalies that interfere with orderly extraction of valuable resources. Sommerfield, A., "Uber die Austreitung der Wallen in der Drathlosen Telegraphic, Ann. Physik, Ser 4 Vol. 81, No. 17, pp. 1135-1153, Dec. 1926, provided early theoretical insite into surface wave communications, and Wait, J.R. (quest editor) May 1963 issue of IEEE Trans. Ant. and Prop., Vol. AP.1, No. 3, contributed knowledge regarding communications and techniques for investigating subsurface geological features.

J.R. Wait and D.A. Hill, "Coaxial and Bifilar Modes on a Transmission Line in a Circular Tunnel", Preliminary Report to U.S. Bureau of Mines on Contract No. H0122061 (Sept. 1974); relates to an investigation of propagation of guided waves in tunnels and formulated a theoretical model showing that monofilar and bifilar propagation modes exist for two-wire cable and trolley tracks and power cable types of conductors.

Also, a method for measuring the bulk electrical parameters of a region of the earth which involves measuring the intensity and phase shift values of the magnetic field of an electromagnetic wave simultaneously received in two boreholes is described in R.N. Grubb, P.L. Orswell and J.H. Taylor, "Borehole Measurements of Conductivity and Dielectric Constant in the 300 kHz to 25 MHz Frequency Range", Radio Science, Vol. II, No. 4 (Apr. 1976).

J.R. Wait, "The Magnetic Dipole Antenna Immersed in a Conducting Medium", Proceeding of the IRE (Oct. 1952), points out that a fundamentally different power dissipation relationship exists between electric and magnetic dipole antennas. In the electric dipole case, the radial wave impedance near the dipole is largely real, whereas the impedance is imaginary in the case of the magnetic dipole. The large real impedance results in more energy dissipated near the electric dipole than flows out to large distances.

R.F. Harrington, "Time Harmonic Electromagnetic Fields", McGraw Hill, N.Y. (1961), describes a formula for calculating the current flow produced in a conductor by an incident electric field.

Synchronous detection principles are described by W.R. Bennett and J.R. Davey in "Data Transmission", McGraw Hill Book Company (1965).

Finally U.S. Pat. No. 4,577,153, "Continuous Wave Medium Frequency Signal Transmission Survey Procedures for Imaging Structures in Coal Seams", by L.G. Stolarczyk describes a method for constructing images of structures in coal seams using the radio imaging method.

None of the prior art suggests a practical technique for discovering the existence of previously undetected underground tunnels or ore veins using synchronous methodology.

SUMMARY OF THE PRESENT INVENTION

It is therefore an object of the present invention to detect the existence of horizontally or vertically oriented underground electrical conductors surrounded by less electrically conducting rock.

It is another object of the present invention to detect underground tunnels targeting the strongest feature of the tunnel.

It is another object of the present invention to detect on underground tunnel's precise location.

It is another object of the present invention to detect thin rock conductors such as mineralized ore veins.

It is another object of the present invention to use cross-hole phase coherent instrumentation to measure the separation distances between boreholes in the stop mining technique.

Briefly, a preferred embodiment of the present invention includes the steps of generating a first electromagnetic field; using the electric field component of the first electromagnetic field to induce a synchronized current flow in an underground electrical conductor; using the magnetic field component of a second electromagnetic field, generated by the current induced in the electrical conductor, to induce a signal in an antenna of a phase coherent receiver deployed in a drillhole; and using synchronous detection measurements and analysis to confirm the existence of the electrical conductor.

The first electromagnetic field can be generated either by current flowing in a long surface conductor or in a downhole vertical magnetic dipole antenna if an electrical conductor to be detected is horizontally oriented or by a horizontal magnetic dipose antenna if the electrical conductor is vertically oriented. In intermediate orientations, the electric field components of the electromagnetic wave must be polarized with, or tangetial to, the surface of the electrical conductor. The surface conductor and the downhole antenna are driven by a transmitter. Current can also be induced in underground conductors by electrical noise generated by electrical equipment within the mine or by electromagnetic waves generated on the surface of the earth. The electrical conductor should have a long longitudinal dimension and be surrounded by less electrically conducting rock. For example, the electrical conductor could be a trolley track or a telephone or power line contained in an underground tunnel. Electrolytic water either filling the tunnel or running through a pipe in the tunnel could also function as the electrical conductor as could a thin chemically mineralized ore vein surrounded by less conductive rock.

The phase coherent receiver comprises a vertical or horizontal magnetic dipole antenna, a mixer unit, and an intermediate frequency (IF) amplifier which is the final signal output unit of the receiver. A coherent frequency source unit is connected to both the transmitter and receiver by fiber optic cables.. The coherent frequency source unit generates a synchronizing transmitter signal, which is an unmodulated, continuous wave, phase synchronous signal, that is sent over the fiber optic cable to the transmitter, and a synchronizing local of oscillator signal that is sent to the receiver over the fiber optic cable. The synchronizing signal can be below or above the operating frequency of the system. If the synchronizing signal is below, then the operating frequency is generated by locking a phase locked loop (Pll) to the synchronizing signal. The synchronized transmit signal ($S_T$) is applied to the input terminals of the transmitter's power amplifier which generates the transmitter output signal. The transmitter output signal excites the long surface conductor, or the downhole antenna, which generates the first electromagnetic field. The electric field component of the first electromagnetic field induces the synchronized current flow in the underground electrical conductor. The magnetic field component of the second electromagnetic field, produced by the induced current flow, is received in the phase coherent receiver where the received signal is mixed with the synchronized local oscillator signal to produce an intermediate signal. The intermediate signal is sent back to the coherent frequency source unit over an uplink fiber optic fiber where intensity and phase shift measurements of the received signal are made by a synchronous detector.

The phase coherent instrumentation can also be used to detect changes in the distance separating a pair of drillhoses used in a mining technique, e.g. The block-caving, vertical crater, retreat or stope mining techniques. The transmitter and phase coherent receiver are lowered into separate drillholes and phase shift changes in the received signal are measured and correlated to distance changes.

An advantage of the present invention is that the use of an unmodulated continuous wave carrier signal and synchronous detection techniques increases receiver sensitivity by several orders of magnitude.

Another advantage of the present invention is that the use of fiber optic cables permits phase shift and amplitude measurements to be accurately determined.

Another advantage of the present invention is that the longitudinal dimension of the electrical conductor is utilized in the detection technique.

Another advantage of the present invention is that both vertical, horizontal or intermediate orientations of underground electrical conductors can be detected.

Another advantage of the present invention is that the cross-hole phase coherent instrumentation can be used for detecting a change in the distance separating two drillholes in the stope mining technique.

These and other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENT

Figure 1:
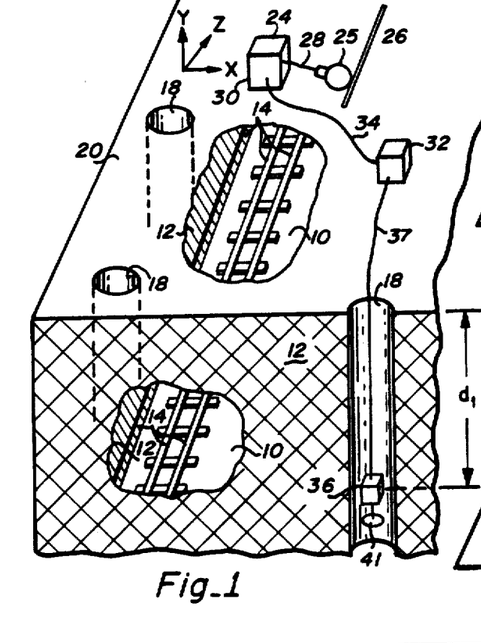
FIG. 1 is an elevational, partially sectioned view of a geological area with an underground tunnel and showing the drillhole configuration according to method I of the present invention.

FIG. 1 shows an underground tunnel 10 surrounded by a rock layer 12 and containing a plurality of electrical conductors 14, illustrated in the form of train tracks. The rock layer 12 conducts electricity much less efficiently than the electrical conductors 14. The electrical conductors 14 may be any objects contained in the tunnel 10 which conduct electricity and which extend along a length of the tunnel 10. The electrical conductors 14 could also be an electrically conducting object embedded in the rock layer 12 such as a thin mineralized conducting ore vein. Other examples of objects which could function as the electrical conductor 14 include small diameter copper power or telephone cables; metal air pipe; trolley power conductor; electrolytic water flowing in plastic water pipes within tunnel 10; or electrolyte water filling the entire tunnel 10.

Figure 2:
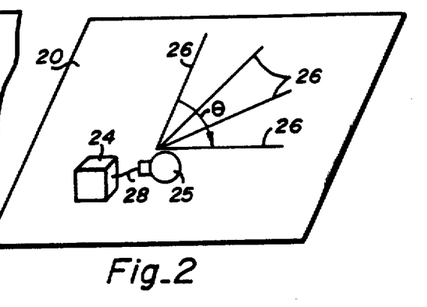
FIG. 2 is a top elevational view of an alternative embodiment of an antenna configuration for use with method I of the present invention.
Figure 3:
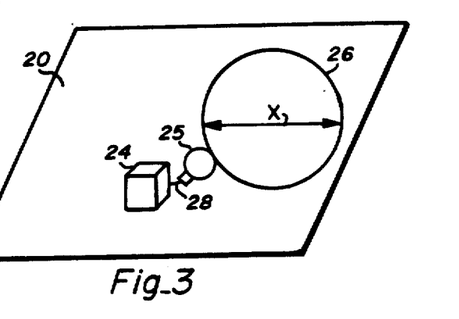
FIG. 3 is a top elevational view of another alternative embodiment of an antenna configuration for use with method I of the present invention.

A plurality of drillholes 18 extend downward through the rock layer 12 from a terrestrial surface area 20. A transmitter 24 is located on the surface area 20 and is coupled by a loop antenna 25 to at least one cable 26. A coupler cable 28 electrically connects the transmitter 24 to the loop antenna 25. When the transmitter 24 is turned on, current flowing in the loop antenna 25 (loop current) is phase synchronized with a signal applied to an input terminal 30 of the transmitter 24. By induction, the loop current causes synchronized current to flow in the cable 26. The cable 26 functions as a long line current antenna and can be a relatively straight piece of insulated wire having a length in the range of 100 to 1500 feet. Alternatively, a plurality of cables 26 may be deployed in a fan-like pattern, as shown in FIG. 2, which subtends an angle $\theta$ of approximately ninety degrees. The cable 26 could also be formed into a cable loop having a large diameter X as shown in FIG. 3.

Returning to FIG. 1, a coherent frequency source unit 32 is optically connected to the transmitter 24 by a fiber optic cable 34 running from the unit 32 to the input terminal 30. A receiver 36 is also optically connected to the coherent frequency source unit 32 by a fiber optic cable 37 comprising an uplink fiber optic fiber 38 and a downlink fiber optic fiber 40 (shown in FIG. 4). The receiver 36 includes an electrically short ferrite vertical loop magnetic dipole antenna 41 with the loop coils of antenna 41 approximately located in the x-z plan (magnetic moment vector aligned with the z-axis). The coherent frequency source unit 32 is capable of generating at least two low frequency signals in the frequency range of one to three hundred kilohertz (1-300 kHz). The coherent frequency source can also generate frequencies in the high frequency (HF) and very high frequency (VHF) bands for use in the precise measurement of distance. The receiver 36 is deployed in at least one of the drillhole 18 at a depth $d_1$.

Figure 4:
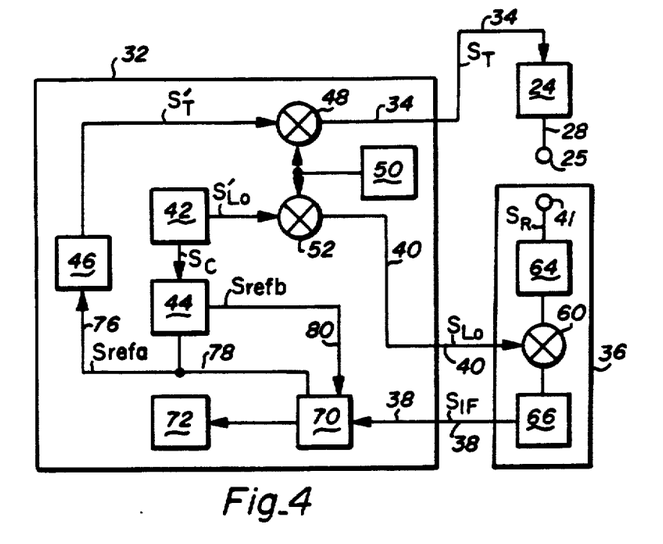
FIG. 4 is a block diagram of the apparatus used in phase synchronous signal transmission and phase coherent signal reception according to the present invention.

In the preferred embodiment, the transmitter 24, the coherent frequency source unit 32 and the receiver 36 comprise the components shown in FIG. 4. A quartz crystal reference oscillator 42 generates a crystal oscillator output signal $S_c$ having a crystal frequency $f_c$ which is divided in a division state machine 44 by an integer K to produce a first reference signal $S_{refa}$ having a reference frequency $f_{ref}$ and a phase of zero degrees. All signals leaving the coherent frequency source unit 32 are phase synchronized with the signal $S_{refa}$. The division machine 44 also produces a second reference signal $S_{refb}$ offset in phase from $S_{refa}$ by ninety degrees. The signals $S_{refa}$ and $S_{refb}$ are required in the synchronous detection process.

The signal $S_{refa}$ is used in a conventional phase lock loop circuit 46 to generate a preliminary transmit signal $S_T'$ which is phase synchronized with the signal $S_{refa}$. The oscillator 42 output signal $S_c$ is also used as a preliminary receiver local oscillator signal $S_{Lo}'$. Before the signals $S_T'$ and $S_{Lo}'$ are sent to the transmitter 24 and receiver 36 respectively, they are converted in frequency to the required system operating frequency band. The signal $S_T'$ is mixed by difference mixing in a mixer 48 connected to a quartz crystal conversion oscillator 50 to produce an operating transmit signal $S_T$. Similarly, the signal $S_{Lo}'$ is mixed with the same quartz crystal conversion oscillator 50 signal in a mixer 52 to produce an operating receiver local oscillator signal $S_{Lo}$. After mixing, the signals $S_T$ and $S_{Lo}$ have the frequencies $f_o$ and $f_{Lo}$, respectively. When the signals $S_{Lo}$ and $S_T$ are is derived by this signal generation process, the signals are said to be phase coherent. The phase drift and incidental phase variation occurring in the conversion oscillator 50 appears identically in the total phase of the signals $S_T$ and $S_{Lo}$. The phase drift and incidental phase variations are cancelled in the receiver mixing process.

The signal $S_{Lo}$ is sent by the downlink fiber optic fiber 40 to a mixer 60 contained in the receiver 36. The receiver 36 also comprises the ferrite vertical loop magnetic dipole antenna 41 which is electrically connected to an amplifier 64 which is electrically connected to the mixer 60. The mixer 60 is electrically connected to an IF amplifier/optical fiber transmitter unit 66 which is connected by the uplink fiber optic fiber 38 to a synchronous detector 70 contained in the source unit 32. A microcomputer 72 is electrically connected to the detector 70. The reference signal $S_{refa}$ is sent to the phase lock loop circuit over the lead 76 and to the synchronous detector 70 over the lead 78. The reference signal $S_{refb}$ is sent to the synchronous detector over the lead 80.

In the coherent frequency source unit 32, the crystal frequency $f_c$ of the signal $S_c$ could be 10.24 MHz, the reference frequency $f_{ref}$ of the signal $S_{refa}$ could be 2.5 kHz and the integer K could be 1096. Alternatively, the synchronization signal $S_{refa}$ can be sent over a fiber optic cable to a phase lock loop (PLL) circuit in each downhole instrument (see FIG 11). The PLL's generate the transmit signal ($S_T$) and the receiver local oscillation signal ($S_{LO}$) in the downhole instruments.

The antenna 41 is capable of receiving electromagnetic signals. For example, for a properly oriented magnetic field $H_\theta$ at 100 kHz, the loop emf is given by:

$$emf = 4.02 \times 10^{-2} H_\theta.$$

The loop signal is amplified by the amplifier 64 and mixed with the signal $S_{Lo}$ in the mixer 60. The frequency of $S_{Lo}$ is given by:

$$f_{Lo} = f_o - f_{ref}.$$

Difference mixing in the mixer 60 produces an intermediate signal $S_{IF}$ that is represented by the form:

$$S_{IF} = B\sin(2\pi f_{ref} + \theta_2).$$

The phase $\theta_2$ is the sum of all phase shifts encountered in the signal path commencing at the source unit 32 output terminal to the output terminal of the IF amplifier 66. The geologic medium phase shift contribution $\theta_M$ is included in $\theta_2$. The conventional synchronous detector 70 along with the microcomputer 72 measure the magnitude and phase signal $S_{IF}$.

Figure 5:
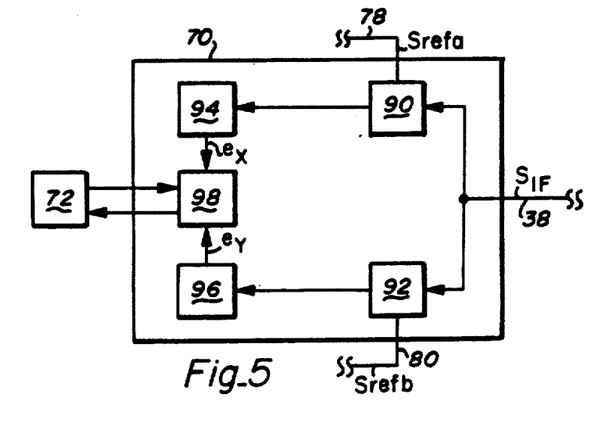
FIG. 5 is a block diagram of the synchronous detector which is a component of the apparatus shown in FIG. 4.

FIG. 5 is a block diagram of the synchronous detector 70. The signal SIF enters the detector 70 through the uplink fiber 38 where it encounters a pair of analog switch units 90 and 92 which receive the signals $S_{refa}$ and $S_{refb}$, respectively. The switches 90 and 92 perform the multiplication processes of $S_{IF} \times S_{refa}$ and $S_{IF} \times S_{refb}$. After low pass filtering by a pair of low pass filters 94 and 96, a pair of orthogonal voltages $e_x$ and $e_y$ are generated and fed to a multiplexer (analog-to-digital converter) 98. The phase $\theta_2$ is calculated as $$\theta_2 = \tan^{-1} e_x/e_y$$

and the amplitude B is calculated as $$B = (e_x^2 + e_y^2)^{\frac{1}{2}}.$$

The theory of operation of the system shown in FIG. 1 is as follows. First, the source unit 32 generates a phase synchronizing signal required for the signal $S_T$ of the frequency $f_o$ which is sent to the transmitter 24 via the cable 34. The signal $S_T$ may be a sine wave having the form $A\sin(2\pi f_o t + \theta_A)$ where A is the amplitude, t is time and $\theta_A$ is the phase shift value. The transmitter 24 and the antenna 25 excite primary current flow in the cable 26. The primary current flow causes a first electromagnetic field $EM_1$ to propagate down through the rock layer 12. If an electric field component $E_z$ of the field $EM_1$ encounters one of the electrical conductors 14 oriented parallel to the length of cable 26, a strong secondary current flow will be induced in the parallel conductor 14. Secondary current flow will also be induced in conductors 14 that are not oriented parallel to cable 26, but the magnitude of this nonparallel current flow will be small. The fan-like pattern of cables 26, shown in FIG. 2, and the large diameter loop configuration, shown in FIG. 3, are designed to maximize the possibility that the polarized electric field component $E_2$ will encounter a parallel electrical conductor 14.

The secondary current flow will propagate along the conductor 14 and will generate a second electromagnetic field $EM_2$ which will propagate through the rock layer 12 with a frequency $f_o$, but with a different amplitude and phase shift than that of the signal $S_T$. The vertical magnetic dipole antenna 41 within the receiver 36 is properly oriented to receive the magnetic component $H_\theta$ of $EM_2$ as a received signal $S_R$. The signal $S_R$, has a wave form $B\sin(2\pi f_o + \theta_B)$ where B is the new amplitude and $\theta_B$ is the new phase shift value. The signal $S_R$ is amplified by the amplifier 64 and sent to the mixer 60. The mixer 60 is being supplied with the signal $S_{Lo}$ generated in the coherent frequency source unit 32 and transmitted to the mixer 60 via the fiber 40. The signal $S_{Lo}$ has the form $D\sin 2\pi(f_o - f_{ref})t$ where D is the amplitude of the signal $S_{Lo}$. The mixer 60 forms a final signal $S_{IF}$ by adding $S_{Lo}$ to $S_R$ yielding equation (1).

$$S_{IF} = C \sin(2\pi f_{ref} t + \theta_m) \quad (1)$$

where C is the amplitude of $S_{IF}$ and $\theta_m$ is the phase shift.

The final signal $S_{IF}$ is sent through the uplink fiber 38 to the synchronous detector 70 where the amplitude C and the phase shift $\theta_m$ are determined using synchronous detection principles. In the absence of a conductor 14, the amplitude C will be nearly zero because the separation between the receiver 36 and the cable 26 is too great to permit more than extremely weak reception of the signal $S_T$.

In the preferred embodiment, the cable 26 would be located at a specific position and the receiver 36 would be moved between the plurality of drillholes 18 with at least one phase shift measurement taken at each drillhole 18 location. Taking a plurality of amplitude and phase shift measurements at a different plurality of depths $d_1$ within each drillhole 18 would improve the probability of detecting the conductor 14. Alternatively, the receiver 36 could be held within a single drillhole 18 and the position of the cable 26 could be varied.

For convenience, the method of placing the cable 26 at a surface location and detecting the conductor 14 by making measurements with the downhole receiver 36, will be referred to as method I. The feasibility of method I has been verified by a combination of theoretical and empirical measurements.

In an actual experiment, a 100 meter long cable was positioned on the surface of the York Canyon Mine in the general direction of the man and material passageway located approximately one hundred meters below the surface. The mudstone roof rock had a conductivity of approximately $1 \times 10^{-2}$ mhos/meter. The cable was excited with approximately 100 mA of current at 300 kHz. A current of eleven microamperes was measured in a telephone cable located in the passageway.

Table A shows the minimum detectable secondary current levels for non-coherent and coherent phase receivers when the conductor 14 and the receiver 36 were separated by thirty and seventy meter radial distances. These figures indicate that the eleven microamperes signal actually measured in the York Canyon Mine is sufficient for detecting the conductor 14 located seventy meters from the receiver 36 using the synchronous detection technique of method I.

TABLE A

Minimum Detectable Tunnel Electrical Conductor Secondary Current in Microamperes
(f = 100 kHz; $\sigma = 10 \times E - 03$ mhos/m; $\epsilon_r = 10$)

| Antenna Diameter | Coherent Receiver | | Non-Coherent Receiver | |
|---|---|---|---|---|
| | 30 m | 70 m | 30 m | 70 m |
| 1 inch | 0.52 | 1.78 | 50.1 | 177.8 |
| 2 inches | 0.13 | 0.44 | 12.58 | 48.08 |

The data in Table A was calculated by the following method. First, the following equation (2) was used to calculate the magnetic field component $H_\theta$ produced by the secondary electromagnetic field $EM_2$.

$$H_\phi = -\hat{\phi}\left(\frac{iI_s k}{4}\right)H_1^{(2)}(\kappa\rho). \quad (2)$$

where $\rho$ = the radial distance from the conductor;
$I_s$ = the secondary current in amperes; and
$H_1^{(2)}(\kappa\rho)$ = the Hankel function of the second kind of first order (Equation 2 is taken from M.L. Burrows, "ELF Communications Antennas" Peter Peregrinus Ltd., England (1978)).

Next, when $H_\phi$ threads the loop area of the ferrite vertical magnetic dipole antenna 41, a receiving antenna response, given by Faraday's law, is produced according to:

$$emf = AN\mu\omega|H_{74}5| \quad (3)$$

where

A = the area of the loop antenna in square meters,
N = number of turns
$\mu r$ = the magnetic permeability of the antenna, and
$\omega$ = the radian frequency of the system.

The sensitivity of a non-phase coherent RIM receiver is better than ten nanovolts and the phase coherent sensitivity improves to 0.1 nanovolt. A vertical ferrite rod antenna exhibits the electrical properties shown in Table B.

TABLE B

Ferrite Rod Antenna Electrical Properties at 100 kHz

| Diameter | Area (m²) | emf (volt) |
|---|---|---|
| 1 inch | $5.07 \times 10^{-4}$ | $(4.02 \times 10^{-2})H_\phi$ |
| 2 inches | $2.03 \times 10^{-3}$ | $(1.62 \times 10^{-1})H_\phi$ |

($H_\phi$ = the value of the magnetic field at the receiver location)

Finally, the minimum detectable current flow in the tunnel electrical conductors is determined from Table B data, the threshold sensitivity of the downhole receivers and the value of magnetic field determined from Equation (2) at radial distances of thirty and seventy meters. It may be possible to increase the receiving loop response by using laminated signal transformer metal, e.g. nickel-iron alloy of the Permalloy type. Very high permeabilities of the order of $10^4$ times the free space value can be obtained. Building the core cross-section area from insulated laminations can increase the area and reduce core loss to the point where they are negligible compared with the winding loss. The long and slender antenna will achieve good coupling to the signal field with operating frequencies below ten kHz; however, these low frequency antennas may also be sensitive to the earth's geomagnetic field. Since the vertical orientation of the antenna will be used in the borehole, the antenna will not strongly couple to the earth's field.

Figure 6:
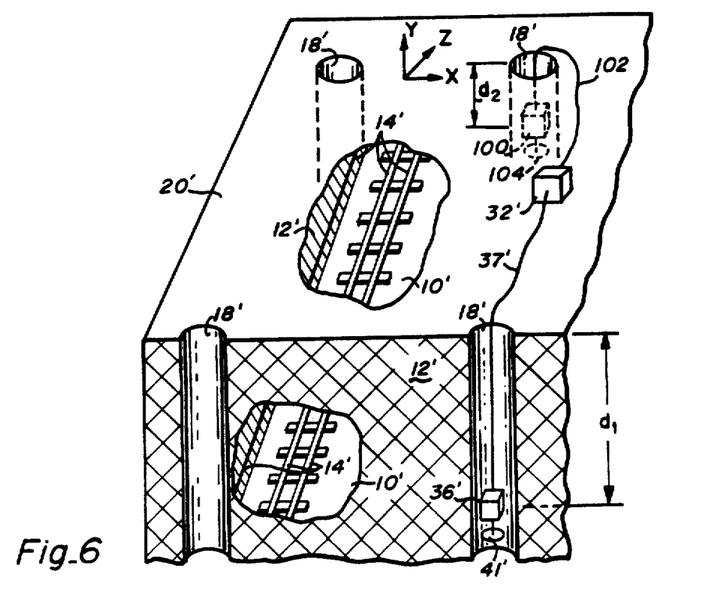
FIG. 6 is an elevational, partially sectioned view of a geological area with an underground tunnel and showing the drillhole configuration according to method II of the present invention.

FIG. 6 shows an alternative method for detecting the electrical conductor 14'. For convenience, this method will be referred to as method II. Elements in FIG. 6 that are identical to elements described with respect to FIG. 1 are designated by the same reference numeral used in FIG. 1 followed by a prime symbol.

In FIG. 6, a synchronized downhole transmitter 100 is positioned at a depth $d_2$ within one of the drillholes 18' and is optically connected to the source unit 32' by a fiber optic cable 102. The transmitter 100 includes an electrically short vertical magnetic dipole antenna 104 such as a ferrite rod antenna with the loop coils of the antenna 104 oriented approximately in the x-z plane.

Figure 7:
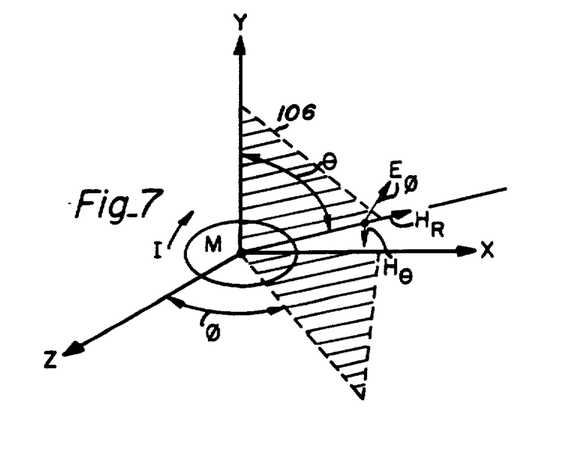
FIG. 7 illustrates the electromagnetic wave field components produced by current flow in a tuned loop antenna.

FIG. 7 shows the fields produced by a magnetic dipole aligned with the y axis. The cartesian coordinate system (x, y, z) is oriented so the loop lies in the horizontal x-z plane with its vertical magnetic moment (M = NIA) aligned along the y axis. Hence, FIG 7 depicts a vertical magnetic dipole antenna. The spherical coordinate system ($\theta, \phi$, r) is used to describe the general orientation of field components in the geologic medium, 12. A meridian, plane 106 is orthogonal to the x-z plane and includes the y axis. The magnetic dipole field components are given by the following equations 4 through 6.

Meridian Plane Azimuthal Component $$H_\theta = \frac{Mk^3}{4\pi}\left[\frac{1}{(kr)^3} + \frac{i}{(kr)^2} - \frac{1}{(kr)}\right]e^{-ikr}\sin\theta \quad (4)$$

Meridian Plane Radial Component $$H_r = \frac{Mk^3}{2\pi}\left[\frac{1}{(kr)^3} + \frac{i}{(kr)^2}\right]e^{-ikr}\cos\theta \quad (5)$$

Longitudinal Component $$E_\phi = \frac{Mk^3}{4\pi}\left[\frac{\mu}{\epsilon}\right]^{\frac{1}{2}}\left[\frac{-1}{kr} + \frac{i}{(kr)^2}\right]e^{-ikr}\sin\theta \quad (6)$$

The electric vector is perpendicular to the meridian plane and subscribes concentric circles around the y axis magnetic dipole moment vector. The terms in equations 4, 5 and 6 have been arranged in the inverse powers of r. In the immediate neighborhood of the magnetic dipole moment, the "static" and "induction" fields in $1/r^3$ and $1/r^2$ predominate while at distance $r \gg \lambda/2\pi kr \gg 1$ only "radiation" field has significant value. The radiation fields are given by the following equations 7 and 8:

$$H_\theta = \left[\frac{Mk^3}{4\pi}\right]\frac{e^{-ikr}}{(kr)}\sin\theta \quad (7)$$

$$E_\phi = \left[\frac{Mk^3}{4\pi}\right]\left[\frac{\mu}{\epsilon}\right]^{\frac{1}{2}}\frac{e^{-ikr}}{(kr)}\sin\theta. \quad (8)$$

The radiation fields are transverse (orthogonal) which is expected of wave propagation at great distances from all electromagnetic sources. The magnitude of the magnetic field component $H_\theta$ can be expressed in terms of the ratio $\alpha/\beta$ and $\beta r$ as $$|H_\theta| = \quad (9)$$

$$\frac{M}{4\pi r^3}[\beta r e^{-(\frac{\alpha}{\beta})\beta r}\{[\frac{1}{\beta r} - \beta r + (\frac{\alpha}{\beta}) + \beta r(\frac{\alpha}{\beta})^2]^2 + [1 + 2\beta r(\frac{\alpha}{\beta})]^2\}^{\frac{1}{2}}].$$

where, $\kappa = \beta - ia$, and
$\alpha$ = attenuation constant (imaginary part of the wave number) in neper/meter; and phase constant (real part of the complex wave $\beta$ = phase constant (real part of the complex wave number in radians/meter)

The phase $\theta$ is mathematically represented by $$\theta = -\beta r + \text{Tan}^{-1}\left[\frac{1 + 2\beta r\left(\frac{\alpha}{\beta}\right)}{\frac{1}{\beta r} - \beta r + \beta r\left(\frac{\alpha}{\beta}\right)^2 + \left(\frac{\alpha}{\beta}\right)}\right]. \quad (10)$$

The axis of the receiving loop antenna 104 is always parallel to the axis of the drillhole 18'. The loop response is given by Equation 3 (Faraday's Law). The processing of the received signal SR in the source of unit 32' recovers the logarithm of the loop response as $$20\text{Log}_{10}|H_\theta| = 20\text{Log}_{10}\frac{M}{4\pi r^3} + 20\log_{10}[A], \quad (11)$$

When $\beta r$ is less than 0.5 radians, the magnetic field is relatively independent of the media electric parameters; however, when $\beta r$ is greater than 2, the amplitude of the field is highly dependent on the ratio $(\alpha/\beta)$. If $\beta r$ is less than 0.5 radian, the phase shift change with range is less than four degrees. When $\beta r$ is between 0.5 and 1.5 radians, the phase shift change with distance may increase or decrease with range and depends on $(\alpha/\beta)$. Above $\beta r = 1.5$, the phase shift increase with range. Phase shift depends strongly on $(\alpha/\beta)$.

The magnitude of the electric field component E can be expressed as $$|E_\phi| = \quad (12)$$

$$\frac{M}{4\pi r^3}\left[\frac{\mu}{\epsilon}\right]^{\frac{1}{2}}[\beta r e^{-(\frac{\alpha}{\beta})\beta r\{[-\beta r+(\frac{\alpha}{\beta})+\beta r(\frac{\alpha}{\beta})^2]^2+[1+2\beta r(\frac{\alpha}{\beta})]^2\}^{\frac{1}{4}}}]$$

and the phase $\theta$ by $$\theta = -\beta r + \text{Tan}^{-1}\left[\frac{1 + 2\beta r\left(\frac{\alpha}{\beta}\right)}{-\beta r + \left(\frac{\alpha}{\beta}\right) + \beta r\left(\frac{\alpha}{\beta}\right)^2}\right]. \quad (13)$$

In a uniform geologic medium, the meridian plane magnetic field ($H_\theta$) component is polarized normal to the area of the receiving loop antenna 41'. At 100 kHz, the loop emf is given by $$emf = (4.02 \times 10^{-2})H_\theta. \quad (14)$$

Method II can be summarized as follows: The source unit 32' sends the signal $S_T$ having the frequency $f_o$ to the transmitter 100. The signal $S_T$ has the - waveform previously described for method I, specifically, A sin $(2\pi f_o t + \theta A)$. The transmitter 100 then causes a first electromagnetic field $EM_1$, to propagate through the rock layer 12'. As in method I, secondary current will be induced in the conductor 14' when an electric field component $E_z$ of the field $EM_1$ encounters one of the electrical conductors 14' oriented in the z direction. Calculations have shown that current response is a weak function of frequency from one kHz (through at least three hundred kHz). Thus, any frequency in this band could be used as the frequency $f_o$. However, since the receiver antenna 62 output voltage increases with frequency, it is advisable to use the highest practical frequency and 100 kHz is used preferrentially. The receiver 36', positioned in a seperate drillhole 18' from the transmitter 100, responds to the magnetic field $H_\phi$ produced by the secondary current flow. The phase shift and amplitude values can be calculated from the data received at the receiver 36' in the same manner as previously described for method I.

In method II, optimal search strategy will be achieved when the transmitter and receiver drillholes 18' each have center lines orthogonal to the longitudinal dimension of the conductor 14' i.e., when the conductor 14' and the drillholes 18' all lie along parallel lines. Additionally, in method II, the drillholes 18' should be in close proximity to the conductor 14', generally, within approximately 100 meters. Furthermore, a plurality of measurements can be taken at each drillhole 18' location by varying the depth $d_1$ of the receiver 36' or the depth $d_2$ of the transmitter 100. The depths $d_1$ and $d_2$ can be different.

Table C lists the results of experimental measurements of the secondary current flow induced in a two foot wide mine ventillation pipe (conductor 14' by the downhole transmitter 100. Magnetic field strength measurements were made in the tunnel with a tuned loop antenna (300kHz) and a field strength meter. The emf, defined by Equation (15) was measured and recorded in decibels above one nanovolt.

TABLE C

| | Measured Field Strength Inside a Tunnel (dB re 1 nanovolt) | | |
|---|---|---|---|
| Measuring Station | Approximate Distance (ft) From Transmitter 44 | Field Strength (H) Center of Tunnel (10') | Field Strength (H) Near Conductor (14') |
| 1 | 300 | 85.6 | 100 |
| 2 | 250 | 82.0 | 100 |
| 3 | 200 | 86.0 | 101 |
| 4 | 150 | 101.0 | 96 |
| 5 | 100 | 111.0 | 103 |
| 6 | 50 | 123.0 | * |
| 7 | 50 | 131.0 | * |

* = Pipe ends $$emf = A\mu N 2\pi f |H| \quad (15)$$

where
N = the number of turns used in the antenna design,
A = the area of the loop in square meters,
f = the operating frequency,
$\mu$ = magnetic permeability of the antenna, and
H = field strength from Table C.

Figure 8:
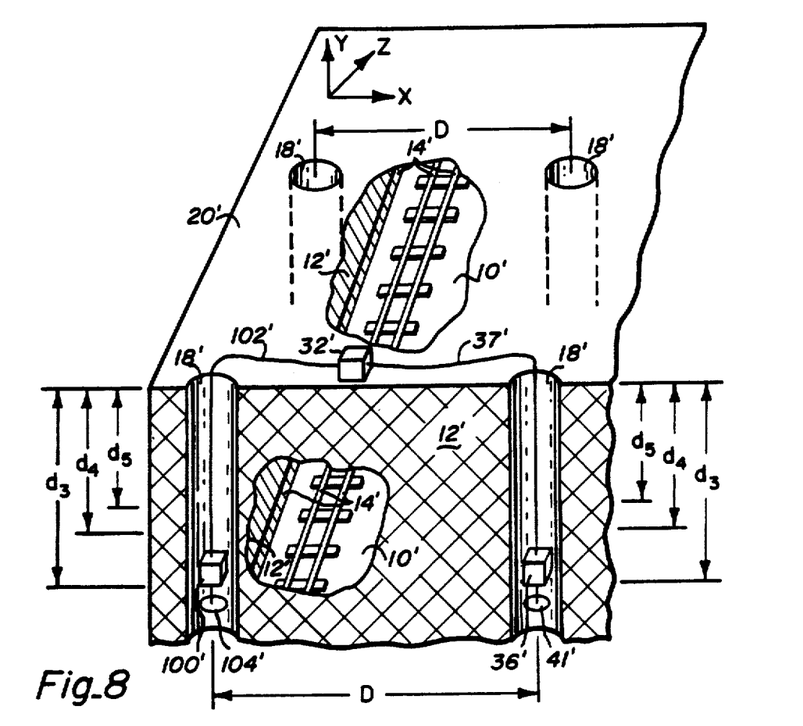
FIG. 8 is an elevational, partially sectioned view of a geological area with an underground tunnel and showing the drillhole configuration according to method III of the present invention.

FIG. 8 shows another alternative method for detecting the underground conductor 14'. For convenience, this method will be referred to as method III. Elements in FIG. 8 that are identical to elements in FIGS. 1 or 6 are designated by the same reference numeral followed by a prime designation.

In FIG. 8, the transmitter 100' and the receiver 36' are positioned in the pair of drillholes 18' separated by a distance D, that straddle the conductor 14' (i.e., one drillhole 18' is located on each side of the conductor 14' so that the transmitter 100' and the receiver 36' are contained in a vertical plane that bisects the conductor 14'). In method III, the maximum value for the separation distance D is approximately twenty meters. In one technique for using method III, referred to as a reconnaissance scan, the transmitter 100' and the receiver 36' are always maintained at the same depth, depth d₃ for example, with respect to each other. After a measurement is taken, the transmitter 100' and the receiver 36' are each moved to a second depth, d₄ for example, and another measurement is taken.

This cross-hole reconnaissance scan process is designed to measure the receiver drillhole total field amplitude and the phase shift as both of these parameters vary with depth. The variation occurs at the depth corresponding to the location of the conductor 14'. The transmitter 100' emits the plane wave signal $S_T$ having the frequency $f_o$ as described previously for method II. The electric field component of the signal $S_T$ ($E_z^i$) is polarized in the direction parallel to the conductor 14' (the z direction). When the signal ST encounters the conductor 14' a scattered wave is produced which simultaneously produces secondary current flow in the conductor. This scattering phenomena increases with decreasing thickness of the conductor 14' when the electric field component is z polarized. The electric field component of the scattered wave ($E_z^s$) is also polarized in the z direction. The total electric field ($E_z$) at any point outside the conductor 14' is given by $$E_z = E_z^i + E_z^s. \quad (16)$$

Variations in the amplitude and phase shift parameters are determined by measuring $E_z$ at the position of the receiver 36'. The phase shift and amplitude determinations are made as previously described for method I. For computational purposes, the receiver drillhole field is the vector sum of $E_z^i$, computed at the radial distance $r_1$ extending from the transmitter loop, antenna 104' to the receiver loop antenna 41', and $E_z^s$ computed at a radial distance $r_2$ extending from the conductor 14' to the receiver loop antenna 41'.

In a second technique utilizing the method III transmitter/receiver configuration, the receiver drillhole field can also be measured versus the depth of the receiver 36' above and below the depth of the conductor 14'. In this technique, called a shadow scattering wave scan, the transmitter 100' is held at a specific depth, d₄ for example, and the receiver 36' is moved to incremental elevations, such as d₃, d₄ and d₅, above and below the conductor 14'. $E_z$ is measured at each incremental elevation. Alternatively, the depth of the receiver 36' could be held constant and the depth of the transmitter 100' could be varied.

Table D lists the results obtained in a typical shadow scattering wave scan. In this system, $f_o$ was 10 kHz and the conductivity of the rock layer 12' was 0.001 mho/m. The distance D was twenty meters and the antenna 104' was five meters from the conductor 14'. With synchronous detection techniques, amplitude resolution of better than 0.1 dB is possible and phase shift resolution of better than 0.3 degrees can be measured.

TABLE D

| Elevation Change Above/Below Conductor (In meters) | Initial Amplitude (dB) | Change In Amplitude (dB) | Initial Phase (degrees) | Phase Shift (degrees) |
| --- | --- | --- | --- | --- |
| 0 | 65 | 5 | 44 | 88 |
| 13 | 65 | 4.5 | 44 | 84 |
| 20 | 65 | 3.9 | 44 | 75 |

Because of the limitation imposed on the method III technique by the restricted range of acceptable D values, method III is most useful for pinpointing the location of the conductor 14' after its rough location has been determined by methods I or II. Method III is also useful where the conductor 14' is a thin conducting ore vein contained in the rock layer 12'.

Figure 9:
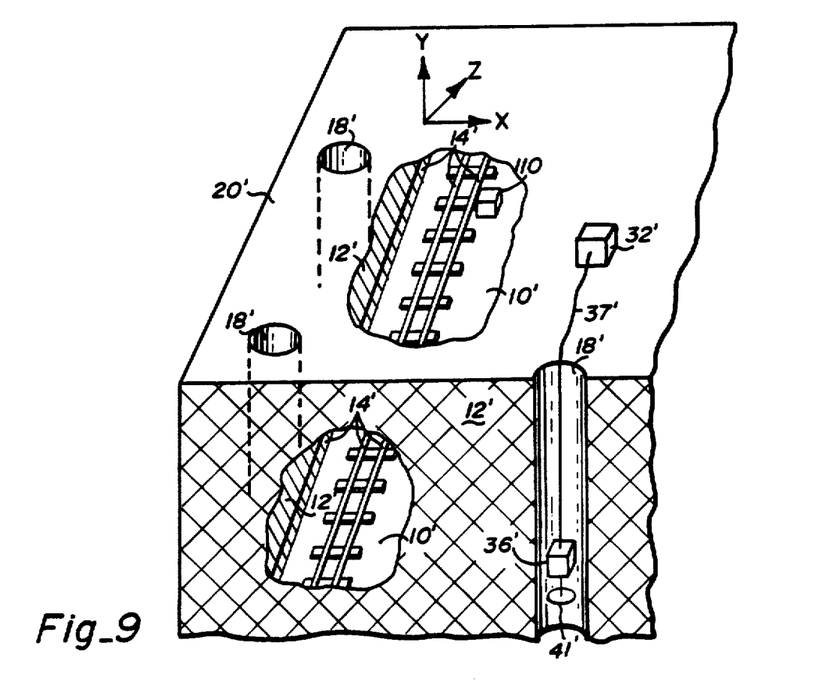
FIG. 9 is an elevational, partially sectioned view of a geological area with an underground tunnel and showing the drillhole configuration according to method IV of the present invention.

FIG. 9 illustrates another alternative method for detecting the electrical conductor 14'. For convenience, this method will be referred to as method IV. Elements of FIG. 9 identical to elements described with respect to FIGS. 1, 6 and 8 are designated by the same reference numeral used in FIGS. 1, 6 and 8, followed by a prime symbol.

In FIG. 9, the receiver 36' is lowered into the drillhole 18'. The receiver 36' is connected to the source unit 32' by the cable 37'. At least one piece of mine electrical equipment 110 is located inside the mine 10'. The mine electrical equipment 110 could be an electrical motor, a trolley power system, a high energy transformer or any other piece of electrical equipment that produces noncontinuous voltage or current (electrical noise) in the electrical power distribution system.

In method IV, the mine electrical equipment 110 generates electrical noise which induces current flow in the electrical conductors 14'. This conductor flow produces an electromagnetic field that propagates through the rock layer 12' where it can be detected by the receiver 36'. For example, electrical motors and power systems switching transients induce electrical noise signal current flow in the underground mine electrical conductors. Switching transients occuring on surface power transmission lines or in the underground mine produce multiple high energy transients in the millisecond time duration range. AC induction motors produce triangular wave form currents during the motor startup period. The resulting frequency spectrum exhibits a 1/f² amplitude function with spectrum components separated by the power system frequency. Trolley power systems produce noise signal currents with a sinx/x amplitude function. A feature of this spectrum is that nulls in the sinx/x spectrum are relatively electrical noise free. High energy transformers frequently produce ferroelectric response at 1800 Hz. These noise signals produce current flow in the mine electrical conductors.

The methods I through IV can also be used in conjunction with each other. For example, method IV could be used as a rough indicator of the existence of the electrical conductor 14. Methods I or II could be used to identify the approximate location of the electrical conductor 14 and method III could be used to pinpoint the location. Method III is best suited for detecting a thin conductive ore vein that intersects the plane between the drillholes 18.

Figure 10:
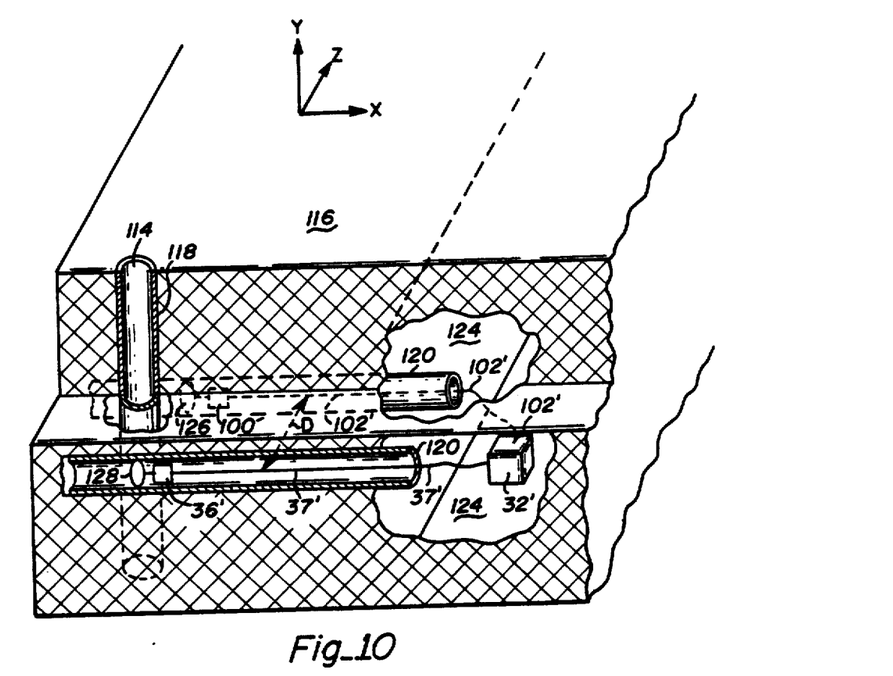
FIG. 10 is an elevational, partially sectioned view of a geological area with a vertically oriented underground electrical conductor showing the drillhole configuration according to method V of the present invention.

FIG. 10 illustrates another alternative method for practicing the present invention. For convenience, this method will be referred to as method V. Elements of FIG. 10 identical to elements described with respect to FIGS. 1, 6, 8 and 9 are designated by the same reference numeral used in FIGS. 1, 6, 8 and 9 followed by a prime symbol.

In FIG. 10, an electrical conductor 114 extends vertically downward (in the y-direction) from a surface region 116. In FIG. 10 the conductor 114 is depicted as being a borehole circumscribed by a casing 118 made of a metal or some other material. Alternatively, the conductor 114 could be an uncased borehole or a vertical shear zone filled with highly conductive mineralized rock or seawater or any other electrically conducting object oriented in the vertical direction. The conductor 114 need not extend all the way up to the surface region 116. The region 116 may comprise, for example, land, concrete or conductive water. The conductive water may fill the borehole.

A plurality of horizontal drillholes 120 extend horizontally away from an underground area 124 (i.e. approximately in the x-z plane). An intermediate orientation is possible provided that the transmitted E field is polarized with the conductor. The underground area 124 is similar to the underground tunnel 10, but may or may not contain the plurality of electrical conductors 14. At least two of the drillholes 120 should be in a horizontal plane(x-z plane) which is approximately perpendicular to the length of the conductor 114. These two drillholes 120 are separated by the distance D and straddle the conductor 114.

The transmitter 100' is inserted into at least one of the drillholes 120. However, in method V, the transmitter 100' includes an electrically short horizontal magnetic dipole antenna 126, such as a ferrite rod antenna, instead of the vertical magnetic dipole antenna 104'. The coils of the antenna 126 lie approximately in the y-z plane of FIG. 10.

The receiver 36' is inserted into at least one of the drillholes 120 not containing the transmitter 100'. The receiver 36' includes an electrically short horizontal magnetic dipole antenna 128, such as a ferrite rod antenna, with coils that lie approximately in the y-z plane of FIG. 10.

The transmitter 100' and the receiver 36' are connected to the coherent frequency source unit 32' by the fiber optic cables 102' and 37' respectively. In method V, the source unit 32' can be located in the underground area 124.

Method V can be used to detect the vertical electrical conductor 114 in an analogous manner to that used in method III described previously (illustrated by FIG. 8). The existence of the conductor 114 can be detected by a reconnaissance scan, where the transmitter 100' and the receiver 36' are always maintained at parallel positions within the drillholes 120 or by the shadow scattering technique where the relative position of the receiver 36' is varied incrementally with respect to the position of the transmitter 100'.

In both techniques, total field amplitude and phase shift are measures as was discussed previously in connection with method III. However, in method V, the electric field component of the signal $S_T$ is polarized in the y direction because that is the direction in which the conductor 114 is oriented. An intermediate orientation is possible provided that the transmitted E field is polarized with the electrical conductor.

Figure 11:
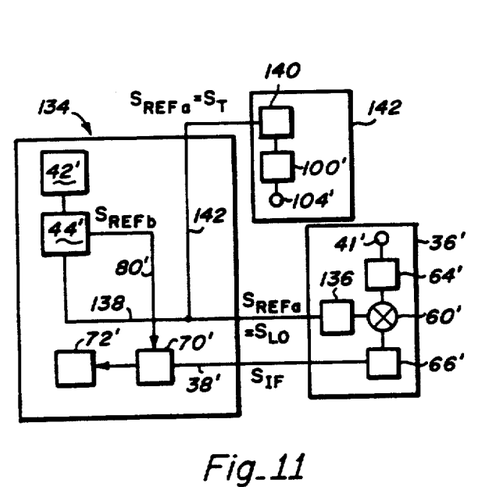
FIG. 11 is a block diagram of an alternative embodiment of the apparatus shown in FIG. 4.

FIG. 11 shows an alternative embodiment of the coherent frequency source unit 32 represented by the general reference numeral 134. Elements in the alternative embodiment 134 which are identical to the elements of the coherent frequency source unit 32 are represented by the same numeral followed by a prime symbol.

In the unit 134, the phase lock loop circuit 46 is eliminated and a receiver phase lock loop(PPL) circuit 136 is connected between the mixer 60' and the division state machine 44' by a fiber optic cable 138. In this configuration, $S_{refa} = S_{Lo}$. The PPL circuit 136 is included within the receiver 36' for insertion in the drillhole 18. A transmitter phase lock loop (PLL) circuit 140 is connected to the cable 138 by fiber optic cable 142. The PPL circuit 140 is also connected to the transmitter 100'. The PPL circuit 140, the transmitter 100' and the antenna 104' comprise a transmitter unit 142 which can be inserted in the drillhole 18'.

With the unit 134, the audio frequency band $S_{refa}$ can be sent over the cables 138 and 142 to synchronize the PLL circuits 136 and 140 respectively in each downhole probe. The fiber optic path bandwidth can be less than 10kHz resulting in lower cost design.

Figure 12:
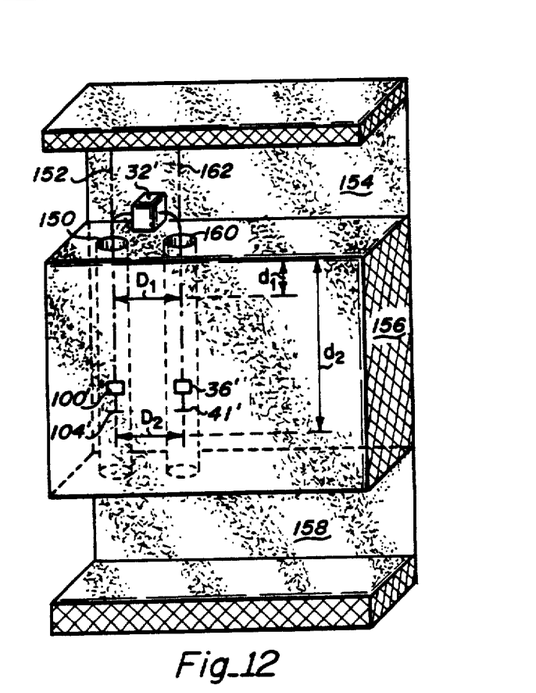
FIG. 12 is an elevational, partially sectioned view of anore vein containing a plurality of drillholes separated by a distance to be determined according to Method IV of the present invention.

FIG. 12 illustrates another alternative method for practicing the present invention. For convenience, this method will be referred to as method VI. Elements of FIG. 12 which are identical to elements described previously with respect to FIGS. 1, 6, 8, 9 and 10 are designated by the same reference numeral used in FIGS. 1, 6, 8, 9 and 10 followed by a prime symbol.

In FIG. 12, the transmitter 100' and the antenna 104' have been lowered into a vertical drillhole 150 along a centerline 152 which is a line coincident with the geometric center of the drillhole 150. The drillhole 150 is drilled vertically from an undercut level 154 through an ore vein 156 to a sub-level 158. The ore vein 156 is a natural resource medium which is to be mined by a technique such as block caving, vertical crater, retreat or by the stope mining method. THe undercut lever 154 is a region cut on top of the vein and the sub-level 158 is a region cut under the vein which runs approximately parallel tot he undercut level 154. The receiver 36' and the antenna 41' have been lowered into a second vertical drillhole 160 which is approximately parallel to the drillhole 150 and which has a centerline 162 coincident with the geometric center of the drillhole 160. The centerlines 152 and 162 are separated at various depths $d_1$ and $d_2$ by the distances $D_1$ and $D_2$, respectively. If the drillholes 150 and 160 are not exactly parallel, $D_1$ will not be equal to $D_2$.

Method VI is used to determine whether the drillholes 15 and 160 are parallel or not. Whether the drillholes are parallel is important because in the blockcaving, vertical crater, retreat or stope mining techniques, the drillholes 150 and 160 are plugged and then loaded with an explosive. Detonation of the explosive cause fragmentation of the ore vein 156 producing small size rocks (muck) which is removed by scoop-tram or long-haul-dump (LHD) equipment on the sub-level 158. Horizontal or near vertical slip planed can cause the drillholes 150 and 160 to have an inclination azimuth angle that is different than zero. If the crosshole distance $D_1$ or $D_2$ is too great, the fragmentation produces large boulders that increases mining costs. Therefore, measurement of crosshole distance can improve extraction efficiency.

In method VI, the transmitter 100' is used to launch an electromagnet (EM) wave which propagates through the ore vein 156 to the receiver 36'. The intensity and phase of the EM field components depend on the distance $D_1$ and on the electric parameters of the geologic medium such as the electrical conductivity($\sigma$), the dielectric constant ($\epsilon$) and the magnetic permeability ($\mu$). In method VI, the preferred operating frequency is 10MHz and in some applications could be as high as 100MHz.

It can be analytically shown that the phase changes by 1.8 electrical degrees for each inch of change in distance between the centerlines 152 and 162. A reference parameter such as the phase $\theta_R$, can be measured at the depth $d_1$ corresponding to the distance $D_1$. At the depth $d_1$, the distance $D_1$, can be accurately determined by a certified near surface downhole survey procedure such as surface laser survey instruments that locate center lines of each drillhole. As the transmitter 100' and the receiver 36' are simultaneously lowered to the new depth, $d_2$, the antenna 41' responds to the magnetic field component of the EM wave. The source unit 32' reads and records the reference parameters, such as the intensity and phase of the received signal, as was described previously for method I. Any phase shift change from the reference phase $\theta_R$ indicates a change in the drillhole centerline distance.

Method VI could also be used to detect changes in the centerline distance between horizontal drillholes by use of the receiver/transmitter configuration shown in FIG. 10.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A method for detecting underground electrically conductive objects which comprises:
 a. drilling a plurality of drillholes about a region containing an underground electrically conductive object;
 b. placing a transmitter and a transmitter antenna within said region, said transmitter having a port to accept a first synchronizing frequency over an electrically non-conductive fiber optic cable;
 c. placing a receiver and a receiver antenna in one or more of the drillholes, said receiver having a port to accept a second synchronizing frequency over an electrically non-conductive fiber optic cable;
 d. connecting by electrically non-conductive fiber optic cables, said transmitter first synchronizing frequency port, and said receiver second synchronizing frequency port to a first and a second port, respectively, of a coherent frequency source unit;
 e. operating the transmitter to generate a first electromagnetic field synchronous to the first synchronizing frequency and sufficient in amplitude to induce a current flow in said electrically conducive object;
 f. operating the receiver to detect a second electromagnetic field, said second electromagnetic field having been produced by re-radiation caused by said current flow in said electrically conductive object, and said second electromagnetic field being different in phase and amplitude from said first electromagnetic field;
 g. amplifying the detected second electromagnetic field and outputting an amplified signal;
 h. mixing the amplified signal with the second synchronizing frequency and outputting a difference signal;
 i. applying the difference signal to a first input of a synchronous detector and a third synchronous frequency to a second input of the synchronous detector, said synchronous detector also having an output; and
 j. processing and analyzing the amplitudes and the phase differences of signals present on the output of the synchronous detector output, said amplitude and phase differences of the signals being in relation to the size and the relative position and orientation of the underground electrically conductive object.

2. The method of claim 1 wherein,
the placement of the transmitter antenna is such that the re-radiation of the electrically conductive object, as detected by the receiver and output from the synchronous detector, is maximized or minimized, and wherein said transmitter antenna is substantially shaped within a straight line, and further wherein the underground electrically conductive object has an elongated shape;
whereby the placement orientation of the transmitter antenna will be indicative of the orientation of the underground electrically conductive object.

3. The method of claim 1 wherein,
said underground electrically conductive object comprises an ore vein surrounded by less conductive rock.

4. The method of claim 1 wherein,
said underground electrically conductive object comprises an alternating current (AC) power line.

5. The method of claim 1 wherein,
said underground electrically conductive object comprises a telephone cable.

6. The method of claim 1 wherein,
said underground electrically conductive object comprises a metal pipe.

7. The method of claim 1 wherein,
said underground electrically conductive object comprises a metal rail.

8. The method of claim 1 wherein,
said underground electrically conductive object comprises an electrically conductive liquid.

9. The method of claim 1 wherein,
the transmitter antenna is electrically coupled to the transmitter by induction or direct connection, and is comprised of at leas one relatively long wire which functions as a long current source antenna, and positioning at least one said long wire at a surface location in the expected or suspected heading of the underground electrically conductive object.

10. The method of claim 1 wherein,
the transmitter antenna includes a vertical magnetic dipole antenna.

11. The method of claim 1 further including the step of:
communicating the difference signal output of a receiver to the coherent frequency source unit over an electrically non-conductive fiber optic cable, the coherent frequency source unit being remote from the receiver, and said difference signal output containing amplitude and phase shift information.

12. The method of claim 9 further including the steps of:
maintaining the transmitter, transmitter antenna, and transmitter output for a time sufficient to complete the remaining steps below;
moving the receiver and receiver antenna successively from one drillhole tot he next;
recording the amplitudes and phase differences of the signals present on the synchronous detector output at each drillhole; and
processing and analyzing the recording in reference to the drillhole related to each recording, whereby the datum points indicating the location and orientation of the underground electrically conductive object are assembled to form a more complete understanding of the size, orientation, and location of the underground electrically conductive object.

13. An apparatus for detecting underground electrically conductive objects comprising:
   a transmitter and a transmitter antenna, the transmitter having a port to accept a first synchronizing frequency over an electrically non-conducive fiber optic cable, and the transmitter being able to generate a first electromagnetic field synchronous to the first synchronizing frequency and sufficient in amplitude to induce a current flow in an underground electrically conductive object;
   a receiver and a receiver antenna arranged as a vertical magnetic dipole antenna, the receiver having a port to accept a second synchronizing frequency over an electrically non-conductive fiber optic cable, and the receiver sensitive enough to detect a second electromagnetic field, said second electromagnetic field having been produced by re-radiation caused by said current flow in said electrically conductive object, and said second electromagnetic field being different in phase and amplitude from said first electromagnetic field, and the receiver having a mixer means to mix the second synchronizing frequency with an amplified signal responsive to the detected second electromagnetic field, said mixer means' output forming a mixer output signal compatible with electrically non-conductive fiber optic cable, said mixer output signal containing amplitude and phase information relative to the relative location and orientation of the underground electrically conductive object;
   a first electrically non-conductive fiber optic cable between said transmitter first synchronizing frequency port and a first port of a coherent frequency source unit;
   a second electrically non-conductive fiber optic cable between said receiver second synchronizing frequency port to a second port of the coherent frequency source unit; and
   a third electrically non-conductive fiber optic cable between the receiver mixer output signal to a third port of the coherent frequency source unit.

14. The apparatus of claim 13 wherein,
   said transmitting antenna comprises at least one long wire positioned at a surface location.

15. The apparatus of claim 13 wherein,
   said first synchronizing frequency port communicates a signal that is in the range of 50 KHz to 300 KHz.

16. The apparatus of claim 13 wherein,
   the receiver includes a phase lock loop circuit.

17. The apparatus of claim 13 wherein,
   the coherent frequency source unit includes a phase lock loop circuit.

* * * * *